June 17, 1969   C. H. BLANCH ET AL   3,450,369
REEL CONSTRUCTION HAVING PAWL OPTIONALLY MOUNTED
Filed Aug. 15, 1967

INVENTORS.
CHARLES H. BLANCH &
BY HENRY F. OLZAK

*Wesley E. Taylor*
ATTORNEY.

United States Patent Office 3,450,369
Patented June 17, 1969

3,450,369
REEL CONSTRUCTION HAVING PAWL
OPTIONALLY MOUNTED
Charles H. Blanch, Maple Heights, and Henry F. Olzak, Independence, Ohio, assignors to Alert Stamping and Mfg. Co., Inc., Bedford Heights, Ohio, a corporation of Ohio
Filed Aug. 15, 1967, Ser. No. 660,731
Int. Cl. B65h 75/48
U.S. Cl. 242—107.7  8 Claims

ABSTRACT OF THE DISCLOSURE

A reel construction having a ratchet and pawl wherein the pawl is of such design that it can be optionally, reversibly mounted on the reel, so that the same ratchet and pawl can be selectively placed in an engaging, interlocking relationship for either a clockwise or counterclockwise rotation of the reel and a non-engaging, sliding relationship for the reverse direction.

Background of the invention

Although the following description refers principally to a reel and cord structure, it is understood that the improved ratchet and pawl structure of the invention is adapted as well for all types of drums, spindles, sheaves, or the like designed to pay out and receive a cord, rope, strand, cable, or other like members.

Cooperating ratchet and pawl structures have been suggested to arrest the turning of a reel at one of several selective rotary stations when the length of the cord released or paid out reaches a desired length. The ratchet and pawl are subsequently disengaged to release the reel at such an arrested station when it is desired to return or rewind the cord back onto the reel.

For some purposes, a reel must be mounted so that a cord or the like is paid out by clockwise rotation of the reel; while for other purposes, with substantially the same physical mounting of the reel, the cord must be paid out by a counterclockwise rotation of the reel. Naturally, the operational disposition of a pawl and ratchet with respect to each other differs markedly depending on which direction of the rotation they must interengage and on which direction of the rotation they must freely pass each other.

At present, it is necessary to provide for different stampings, particularly for pawls, in order to obtain a pawl and ratchet design for engagement in a desired rotary direction, that is, either a right-hand or left-hand operation. It is similarly necessary to inventory such different parts, to assemble reels in a manner dictated by the pawl and ratchet designs, preferably to indicate on the assembled reel the type of "pay-out" action, and the like. All of this complicates and renders more expensive the commercial production of such reel structures.

Summary of the invention

In the present reel construction, the same pawl can be mounted for either a left-hand or a right-hand rotation of the reel. In particular, the pawl is shaped so that it may be optionally, reversibly mounted with either of its two major sides facing the reel. In this manner, the ratchet and pawl can be selectively placed in an engaging, interlocking relation for one rotary direction, or by turning over the pawl, the same pawl and ratchet can be placed in an engaging, interlocking relation for the reverse rotary direction.

To achieve this result, the pawl is of a specific configuration. In particular, the pawl has a nose portion defined by a coterminating curved riding surface and a substantially flat land. The nose portion is offset with respect to a central longitudinal axis passing through the pawl, and the flat land is substantially parallel to the same longitudinal axis. Desirably also, the ratchet is of a design to receive easily the nose portion of the pawl and preferably has teeth provided with sides which are symmetrical with respect to radial lines passing through the roots of the teeth and the axis of the rotation of the reel construction.

In operation the curved surface of the pawl rides freely over the ratchet when non-engagement is desired, or the nose portion engages the ratchet when it is desired to lock the reel with respect to the shaft which holds the ratchet.

Brief description of the drawing

The accompanying drawings illustrate the present invention wherein.

Description of the preferred embodiments

In one form, the present invention embodies a reel construction or the like having a shaft member and a reel member mounted with respect to each other for relative rotation. One of the members carries a ratchet, and the other member pivotally carries a pawl, the ratchet and pawl interengaging to fix the members one to another. The pawl is adapted to be easily lifted from its pivot pin for optional, reversible mounting, so that either of its two major faces or sides can face the member on which a pawl is pivotally mounted.

Figure 1:
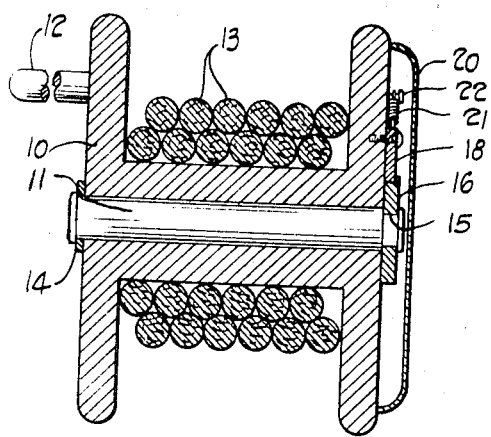
FIGURE 1 is a radial cross-sectional view of a reel embodying the present invention.
Figure 2:
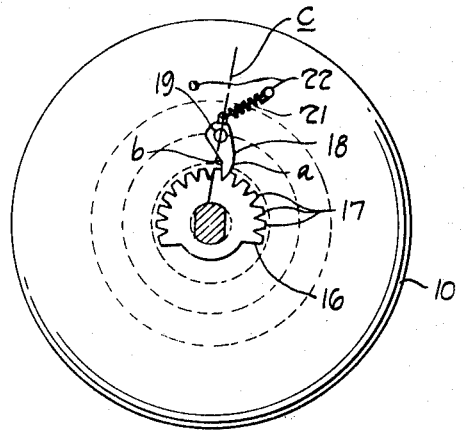
FIGURE 2 is a right-hand side view of FIGURE 1 with a cover plate removed, a pawl being illustrated in engagement with a ratchet.

Referring initially to the embodiment of FIGURES 1 and 2, a reel or sheave 10 is mounted to turn freely about a shaft 11 which, if desired, may be suitably supported with respect to a stand, wall, etc., by conventional means. The reel 10 has a laterally projecting handle 12 by which manually to turn the reel about the shaft and also carries a cord 13 or the like wound about the core of the reel 10.

At one end, the shaft 11 is upset to retain a washer 14 which facilitates the relative rotation between the reel and shaft. At the other end, the shaft 11 has a circumferential groove 15 to receive and hold a ratchet 16. As shown by FIGURE 2, the shaft 11 has flat sides or lands which fit through a matching opening in the ratchet 16. This mating construction enables the ratchet 16 to resist turning with the reel 10 without the addition of other parts to accomplish this purpose.

The ratchet 16 is generally disc shaped and has a series of teeth 17 formed along most of its circumference, the remaining unserrated portion of the ratchet receding sharply toward the center as indicated in FIGURE 2. Due to the particular configuration of the pawl, hereinafter described, it is preferable for the teeth 17 to have sides which are symmetrical with respect to radial lines passing through the roots of the teeth and the shaft 11. This construction for the ratchet promotes easy engagement with a pawl of the present designs with little or no binding.

A pawl 18, generally finger-shaped, is freely mounted on a pin 19 formed in a side of the reel 10 and may be protected by a cover plate 20 suitably secured to the same side of the reel as by spot welding. Alternatively, tabs struck from the side of reel 10 can be used to retain the plate 20. A coil spring 21 connects a tab on the pawl 18 with one of two hooks 22 formed on a side of the reel 10, the right-hand hook being used in the embodiment of FIGURE 2 as there viewed. The spring 21 urges the pawl 18 in a rotational direction about the pin 19 and toward the ratchet 16. The finger-shaped pawl 18 has a nose portion defined by a coterminating curved riding surface *a* and a substantially flat land *b*. The nose portion is offset with respect to a central longitudinal axis passing through the point of connection of the spring 21 with the pawl 18 and also through the pivot pin 19. This axis is shown in FIGURE 2 as well as in the embodiment of FIGURE 4 by the broken line *c*. The flat land *b* is substantially parallel to the axis *c*.

In operation, the coil 13 is pulled from the reel 10, thereby rotating the reel about the shaft 11. The structure shown in FIGURE 2 is designed to pay out the cord 13 on a counterclockwise rotation as there viewed. During this time, the nose portion *a* of the pawl 18 rides over the teeth of the ratchet, there being insufficient pause to allow the nose portion to slip between adjacent teeth 17. When the length of the released cord 13 reaches a desired extent, the reel 10 slows or stops in its rotation due to a lessening pull. This enables the nose portion of the pawl to engage the ratchet teeth as shown in FIGURE 2 and thereby fix the reel 10 and shaft 11 with respect to each other.

To rewind the cord 13 onto the reel 10, a slight outward tug on the cord breaks the engagement between the ratchet 16 and pawl 18. As a rule, the reel is rotated sufficiently to place the pawl 18 by the recessed portion of the ratchet 16 and thereby prevent any engagement with the teeth 17. At this time the reel can be rotated in a reverse direction (clockwise as viewed in FIGURE 2) as by the handle 12 until the cord 13 is retracted as desired.

Figure 3:
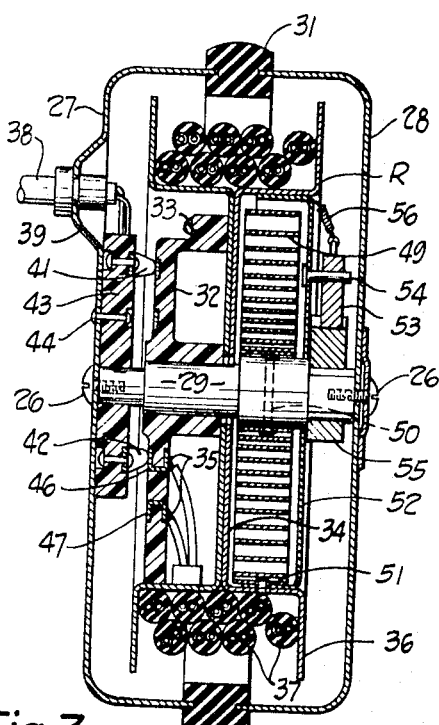
FIGURE 3 is a radial cross-sectional view of an electric cord reel assembly embodying the present ratchet and pawl structure.
Figure 4:
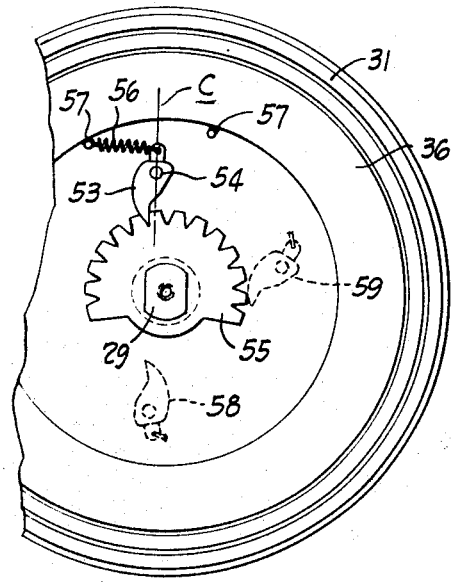
FIGURE 4 is a fragmentary right-hand side view of FIGURE 3 with the outer housing removed.
Figure 5:
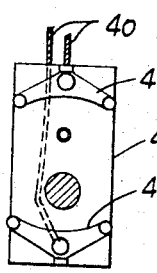
FIGURE 5 is a fragmentary view of a contact block for maintaining a constant electrical connection between an alternating current supply and an electric cord of the reel of FIGURE 3.

The embodiment of FIGURES 3 through 5 illustrates the adaption of the present invention to an electric cord reel. In this embodiment, screws 26 hold cooperating bowl-shaped outer sections 27 and 28 to the ends of a shaft 29 having stepped axial sections to receive parts hereinafter mentioned. An elastomeric band 31 has grooves along its sides to receive the edges of the sections 27 and 28 and define therein a housing for an electric reel. A commutator block 32 freely rides the shaft 29 and is secured by a rivet 33 to a radially extending web portion 34 of a reel generally indicated by R. The web portion 34 terminates in a trough portion 36 formed along the outer periphery of the reel R.

Several turns of an insulated electric cord 37 having dual conductors nest within the trough 36, the outer end leaving the housing through a peripheral opening (not shown) in the sections 27 and 28. An electric potential is supplied to the inner end of the cord 37 through an inlet conductor 38 which enters the section 27 through an offset portion 39 and connects its two leads 40 (FIGURE 5) to contact brushes 41 and 42, respectively, supported on a contact block 43. A rivet 44 secures the block 43 to section 27, the block 43 having an opening freely to pass the shaft 29. The commutator block 32 has inner and outer commutator rings 46 and 47 which engage the contact brushes 42 and 41, respectively, and thereby transfer an electric potential in a conveentional manner to the dual conductors of the cord 37, the inner ends of which are soldered to metal clips 35 contacting the rings 46 and 47.

The reel R includes means to oppose yieldingly its relative rotation about the shaft 29 in a direction to pay out the cord 37 and thereby also effective to urge the return of the reel to its original position with respect to the shaft. In the form illustrated, the reel is rotated by an outward pull on the cord 37 and against the resistance of a spirally coiled spring 49. A rivet 50 fixes an inner end of the spring 49 to the shaft 29, while another rivet 51 secures an outer end of the spring 49 to the trough 36. A circular separator plate 52 freely fits over the shaft 29 and has an inwardly turned rim which is suitably fixed as by spot welding to an underside of the trough 36.

A pawl 53 is pivotally mounted on a pin 54 secured to the plate 52 for engagement with a ratchet 55. The shaft 29 receives and holds the ratchet against rotation by means of flats or lands on opposite sides thereof which match a central opening in the ratchet 55. The latter may be of the same configuration as the ratchet 16 of FIGURES 1 and 2. The pawl 53 is also of the same general configuration as the pawl 18 of FIGURES 1 and 2. It will be noted, however, that the pawl 53 faces the reel R on the pawl's reverse side as compared to its position in FIGURE 2. A coiled spring 56 also connects a tab on the pawl 53 with one of two hooks 57 formed from the separator plate 52. The hook used is in an opposite, left-hand position as compared to the hook 22 used in the embodiment of FIGURE 2. Accordingly, the reel construction of FIGURES 3 through 5 is adapted to pay out the electrical cord 37 by a clockwise rotation as viewed in FIGURE 4. The angular distance between the two hooks 57 may be from about 35° to about 45° measured by an angle subtended on the shaft 29.

The reel assembly of FIGURES 3 to 5 may be adapted for many applications. For example, the reel may be attached to the end of a tank-type vacuum cleaner. In use, the electrical cord 37 is pulled from the reel assembly, the reel R rotating until a sufficient length of cord has been paid out. The action of the pawl 53 is similar to the embodiment previously described. For example, during the paying out of the cord 37, the curved side of the nose portion of the pawl 53 rides freely, passing over the teeth of the ratchet 55. As the reel slows in its rotation, the sharp point of the nose portion of the pawl 53 nests between the teeth of the ratchet 55, thereby locking the ratchet and pawl with respect to each other. At this time, the ratchet is in a position substantially as shown by the solid lines in FIGURE 4 for the pawl 53. The release of the pawl with respect to the ratchet is accomplished by a short outward tug on the cord 37 so as, for example, to move the pawl 53 to the position shown by the dotted lines 58 in FIGURE 4. Thereafter, the energy stored in the tightened coil spring 49 returns the cord onto the reel R. During this return action, the position of the pawl is illustrated by the dotted lines 59 in FIGURE 4.

It will now be apparent that the present invention provides an improved ratchet and pawl construction for a reel or the like. In particular the pawl is adapted for reversible mounting, so that the same ratchet and pawl are operational for either a right-hand or a left-hand pay-out for the same physical mounting of the reel.

We claim:

1. In a reel construction or the like having a shaft and a reel mounted for relative rotation therebetween; a ratchet fixed with respect to the shaft, a pawl pivotally mounted with respect to the reel and adapted for releaseable engagement with the ratchet to secure the shaft and reel together, said pawl having a nose portion defined by a coterminating curved riding surface and a substantially flat land, resilient means interconnecting the pawl and reel, a line passing through the point of connection of the resilient means to the pawl and through the pivotal axis of the pawl defining a central longitudinal axis, both said riding surface and flat land of the pawl being offset in the same direction with respect to the central longitudinal axis, the riding surface of the pawl being adapted to slide over the ratchet, and said nose portion of the pawl being adapted to effect said engagement with the ratchet, whereby said pawl is adapted for optional reversible mounting with either of its two major sides facing said reel, and the same ratchet and pawl can be selectively placed in an engaging, interlocking relation for either a clockwise or counterclockwise rotation of the reel construction and a non-engaging, sliding relation for the reverse rotation.

2. The reel construction of claim 1 wherein said flat land is substantially parallel to the central longitudinal axis.

3. The reel construction of claim 1 wherein said reel member contains an electroconducting cord adapted to be paid out and collected on the reel, and the reel construction further includes electrical input means to impress an electrical potential on said cord.

4. The reel construction of claim 1 wherein the point of connection to said reel of said resilient means interconnecting the pawl and reel is also offset in the same direction with respect to the central longitudinal axis as said riding surface and flat land.

5. The reel construction of claim 1 wherein a substantial number of teeth of said ratchet have sides which are substantially symmetrical with respect to radial lines passing through the roots of said teeth and said shaft.

6. The reel construction of claim 1 wherein said shaft is relatively fixed and the reel rotates thereabout.

7. The reel construction of claim 1 further including means yieldingly opposing the relative rotation between the shaft and reel in one direction and effective to urge the return of said shaft and reel to their original positions.

8. The reel construction of claim 1 wherein said reel contains a cord or the like adapted to be paid out and collected on said reel.

References Cited
UNITED STATES PATENTS

| | | | |
|---|---|---|---|
| 2,530,773 | 11/1950 | Johnson et al. | 242—107.7 X |
| 2,825,924 | 3/1958 | Humphrey | 242—107 X |
| 3,246,363 | 4/1966 | Rogas et al. | 242—107.5 X |

WILLIAM S. BURDEN, *Primary Examiner.*